No. 715,821. Patented Dec. 16, 1902.
J. LEDWINKA.
DRIVING MECHANISM FOR MOTOR VEHICLES.
(Application filed Feb. 10, 1902.)
(No Model.)

Witnesses:
Lynn A. Williams
May M. Zabel

Inventor:
Joseph Ledwinka,
By Charles A. Brown, Cragg & Belfield
Attorneys.

THE NORRIS PETERS CO., PHOTO-LITHO., WASHINGTON, D. C.

UNITED STATES PATENT OFFICE.

JOSEPH LEDWINKA, OF CHICAGO, ILLINOIS, ASSIGNOR, BY DIRECT AND MESNE ASSIGNMENTS, TO IMPERIAL ELECTRIC MOTOR COMPANY.

DRIVING MECHANISM FOR MOTOR-VEHICLES.

SPECIFICATION forming part of Letters Patent No. 715,821, dated December 16, 1902.

Application filed February 10, 1902. Serial No. 93,415. (No model.)

*To all whom it may concern:*

Be it known that I, JOSEPH LEDWINKA, a subject of the Emperor of Austria-Hungary, residing at Chicago, in the county of Cook and State of Illinois, have invented a certain new and useful Improvement in Driving Mechanism for Motor-Vehicles, (Case No. 2,) of which the following is a full, clear, concise, and exact description, reference being had to the accompanying drawings, forming a part of this specification.

My invention relates to mechanism for driving motor-vehicles, and in particular to that class of driving mechanisms by which some or all of the wheels of the vehicle are driven independently by different motors or motor members, one associated with each wheel.

In an application filed by me January 31, 1902, Serial No. 92,050, for automobiles I have shown, described, and claimed a driving mechanism for driving vehicle-wheels individually in which a motor or motor member was arranged at the inner end of the wheel-hub but outside of the same and power-transmitting connection was arranged between the motor thus situated and the wheel. In the present application I will show and describe a driving mechanism for vehicles embodying the general arrangement of my said other application, but having the motor or motor member connected for driving the wheel in a different manner.

Figure 1:
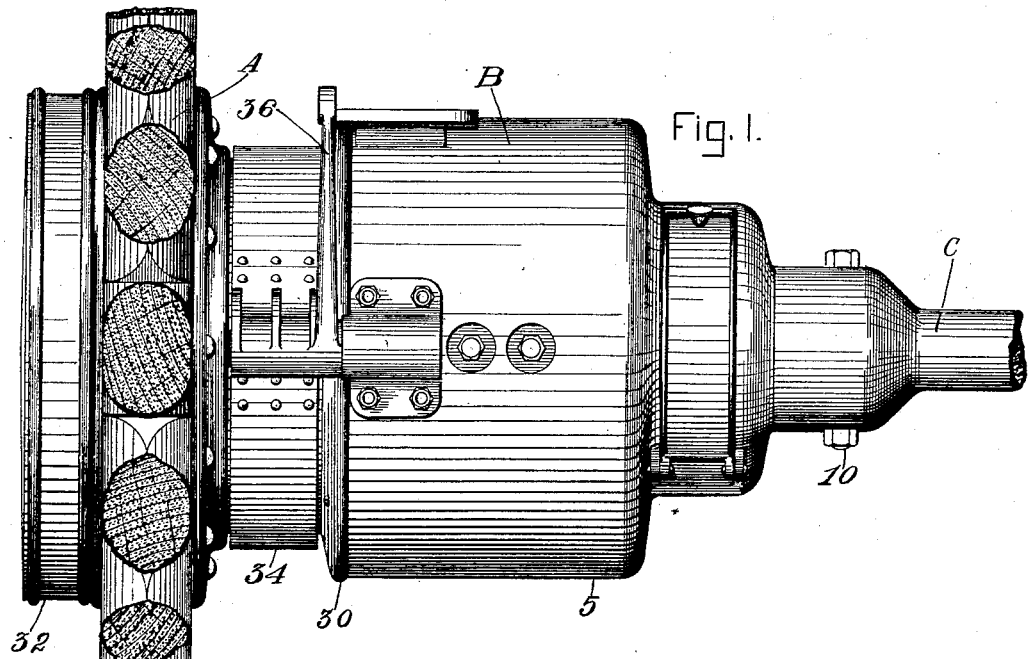
Figure 2:
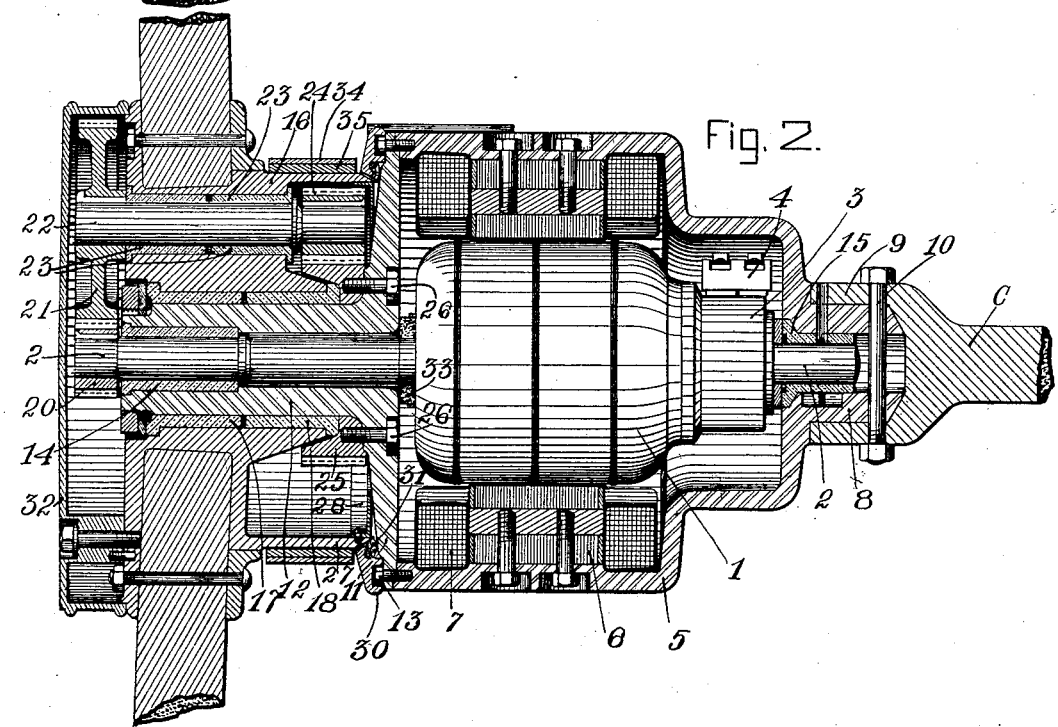

In the accompanying drawings, Figure 1 is a view, largely in side elevation, of a motor mechanism embodying my present invention. Fig. 2 is a longitudinal section of the same.

In the arrangement shown in the drawings for illustrating my invention I have shown the hub and some of the spoke portions of a vehicle-wheel A, the spokes being shown broken off just outside of the hub. It is understood that this is any one of the vehicle-wheels which is to be independently driven by a motor or motor member. The motor B is shown arranged at the inner end of the vehicle-hub, but outside of that hub. The motor is connected with a shaft or axle C, which is understood to be one of the shafts or axles of the vehicle. This general arrangement is in accordance with the invention set forth in my said other application. My present invention relates particularly to the mechanism or power-transmitting connection by which the wheel is driven by the motor or motor member, arranged as shown.

The motor B, which I have shown to illustrate my invention, conveniently consists of any usual or ordinary form of electric motor having a rotary armature 1, mounted on a shaft 2, and having a commutator 3, with brushes 4, which are understood to be connected in any proper or well-known manner. The armature 1 is inclosed in a metallic casing 5, carrying laminated pole-pieces 6, about which are arranged coils 7. The end of the motor-casing nearest the axle C is provided with a projecting portion 8, adapted to fit in a suitable socket 9, formed at the end of the axle, and a pin 10 is extended through the axle-socket projection on the motor-casing, so as to form a proper detachable connection between the motor-wheel and the axle. The end 11 of the motor-casing nearest the wheel is provided with a projection or elongation 12, which serves as an axle for the wheel. This end 11 is desirably bolted to the remaining portion of the motor-casing, as by bolts 13 13. This elongation or axle 12 is made hollow or tubular, and the motor-axle 2 is extended into and through the same, projecting at the outer end thereof. As a preferred arrangement the motor-shaft is provided with Babbitt metal or similar bearings 14 15, respectively located in the axle 12 and in the projection 8. The wheel A is provided with a hub or hub structure 16, and the axle 12 is fitted or introduced into this hub portion, as shown in Fig. 2, suitable soft-metal journals 17 and 18 being desirably interposed between the axle and the hub.

To transmit the rotary movement of the motor to the wheel, the motor-shaft 2, projecting out from the axle 12, is provided with a pinion 20, which gears with a gear-wheel 21, mounted on the end of a supplemental shaft 22, which is supported by the hub portion 16, journals 23 23 being desirably interposed between the shaft and hub portion. The inner end of the supplemental shaft 22 is provided with a pinion 24, which meshes with a gear-wheel 25, made fast to the motor-casing—as, for example, by bolting it to the end 11 of the motor-casing by bolts 26 26, as shown. By this arrangement the motor energy is employed for rotating the wheel, the gearing being a double reduction-gearing.

The hub portion 16 is desirably made with a cylindric portion 27, which extends toward the motor-casing and covers the gear-wheel 25, and this cylindric portion 27 is closed by a closure or plate 28, fastened to the open end of the cylindric portion 27 and arranged to fit against the end 11 of the motor-casing. A ring 30 is arranged at the end of the motor-casing. A packing 31, to exclude dust and the like, is arranged inside of this ring along the line where it joins the cylindric portion 27. The ring 30 is held in position by small screws, which may be concealed by countersinking or may have their heads exposed, as shown. The gear-wheels 20 and 21 are desirably inclosed, as by a cylindric casing or collar 32, which is bolted to the outer side of the vehicle-wheel. Packing 33 is desirably interposed between the armature and the end of the axle 12 to insure the exclusion of dust and the like.

As a matter of further and specific improvement a brake-band 34 is arranged outside of the cylindric portion 27 of the hub 16, and a friction-band 35 is arranged inside of the brake-band 34. The brake-band 34 is preferably made of steel or some such material and the friction-band 35 of wood or leather or the like. To operate the brake-band 34, I have shown a brake-lever 36, having a pivotal connection with the motor-casing and arranged to actuate the opposite ends of the brake-band 34. This lever 36 can be operated by any braking mechanism.

It will be seen from the foregoing that my present invention allows the motor to be connected with the wheel in a simple and efficient manner and that this can be a double reduction-gearing, if desired.

What I claim as my invention is—

1. The combination with a vehicle-wheel, of a hollow axle therefor, a motor arranged at the inner end of the vehicle-wheel hub and having its armature-shaft extended through the hollow axle, and power-transmitting connection for driving the vehicle-wheel, substantially as set forth.

2. The combination with a vehicle-wheel, of a motor arranged at the inner end of the wheel-hub, an axle for the wheel carried by the motor-frame, the axle being made hollow and the armature-shaft being extended into the same, and power-transmitting connection for driving the wheel from the motor-shaft, substantially as set forth.

3. The combination with a vehicle-wheel, of a motor located at the inner end of the wheel-hub, a hollow axle for the wheel, the armature-shaft being extended into the hollow axle and provided with a bearing supporting it therein, a supplemental shaft supported by the wheel-hub, and gearing between the motor-shaft and supplemental shaft and between the supplemental shaft and the vehicle-axle, substantially as set forth.

4. The combination with a vehicle-wheel having a hollow axle, of a motor arranged at the inner end of the wheel-axle and having its shaft extended through the axle, and gearing at the outer end of the motor-shaft connecting said shaft and the wheel, substantially as set forth.

5. The combination of a vehicle-wheel, a motor located at the inner end of the wheel-hub, a hollow axle provided by the motor-frame, the shaft of the motor-armature being extended into and through said hollow shaft, a supplemental shaft supported by the wheel-hub, gears between the end of the motor-shaft and said supplemental shaft, and gears between the supplemental shaft and the vehicle-axle, substantially as described.

6. The combination of a vehicle-wheel, an inclosed motor located at the inner end of the wheel-hub, a hollow axle provided by the motor-casing, a bearing for the motor-shaft arranged within said hollow axle, a supplemental shaft arranged side by side with the motor-shaft and supported by the wheel-hub, gears between the motor-shaft and the supplemental shaft, a gear made fast to the motor-casing, and a pinion on the supplemental shaft gearing with said gear fast on the motor-casing, substantially as described.

7. The combination of a vehicle-wheel, an inclosed motor located at the inner end of the wheel-hub and having the side of its casing nearest the wheel made detachable and provided with an elongation adapted to serve as the wheel-axle, the said elongation being hollow and the motor-shaft being extended into the same, bearings for the motor-shaft, one in the said hollow axle and the other at the other end of the motor-casing, soft-metal journals between the hollow axle and the wheel-hub, a pinion on the end of the motor-shaft, a supplemental shaft mounted on the wheel-hub and provided with soft-metal journals, a gear on said supplemental shaft, gearing with said pinion on the motor-shaft, a pinion on the other end of said supplemental shaft, a gear-wheel fast on the end of the motor-casing providing the axle, a cylindric portion of the wheel-hub covering the last-mentioned gear and pinion and extended substantially to the nearest end of the casing, means for closing the open end of said cylindric portion, and a casing covering gear and pinion at the outer side of the motor-hub, substantially as described.

8. The combination with a vehicle-wheel, of a motor located at one side of the wheel but close to the same, a casing for the motor, the side of said casing nearest the wheel being made attachable and constructed with a hollow elongation providing the wheel-axle, and power-transmitting connection between the motor and wheel, substantially as described.

9. The combination with a vehicle-wheel and a hollow axle, of a motor having the shaft of its rotary member arranged in said hollow axle, and power-transmitting connection between said rotary shaft and the wheel.

10. The combination with a vehicle-wheel and axle therefor, of a motor, and a journal for the rotary member of said motor in said axle, and power-transmitting connection between said rotary member and the wheel.

11. The combination with a vehicle-wheel and a chambered axle therefor, of a motor mounted at the inner end of the wheel-hub and having the rotary shaft of its rotary member journaled at one end in the hollow axle and at the other end in the motor-casing.

12. The combination with a vehicle-wheel, of a motor arranged at the inner end of the vehicle-wheel hub and having its casing provided at one side with a hollow projection forming a hollow axle for the vehicle-wheel, and at the other side with a bearing, and the rotary shaft of the rotary member of the motor being journaled at one end in the hollow axle and at the other end in said bearing, substantially as described.

13. The combination with a vehicle-wheel and a hollow axle therefor, of a rotary shaft arranged in said hollow axle, and power-transmitting connection between said rotary shaft and the wheel.

14. The combination with a vehicle-wheel and a hollow axle therefor, of a rotary shaft journaled in said hollow axle, and power-transmitting connection between said rotary shaft and the wheel.

15. A motor-casing constructed with a hollow projection adapted to form a hollow wheel-axle.

16. A motor-casing having one of its ends made detachable and constructed with a hollow projection adapted to form a hollow wheel-axle.

In witness whereof I hereunto subscribe my name this 5th day of February, A. D. 1902.

JOSEPH LEDWINKA.

Witnesses:
A. MILLER BELFIELD,
HARVEY L. HANSON.